United States Patent [19]

Day, III et al.

[11] Patent Number: 5,481,691
[45] Date of Patent: Jan. 2, 1996

[54] CACHE PAGE REPLACEMENT USING SEQUENTIAL LIFO AND NON-SEQUENTIAL LRU CAST OUT

[75] Inventors: Kenneth F. Day, III; Douglas W. Dewey, both of Tucson, Ariz.

[73] Assignee: International Business Machines Corporation, Armonk, N.Y.

[21] Appl. No.: 141,004

[22] Filed: Oct. 26, 1993

Related U.S. Application Data

[63] Continuation of Ser. No. 689,387, Apr. 22, 1991, abandoned.

[51] Int. Cl.⁶ ................................................. G06F 12/12
[52] U.S. Cl. ........................ 395/425; 364/DIG. 1; 364/41; 364/DIG. 2
[58] Field of Search ........................ 364/200 MS File, 364/900 MS File; 395/425

[56] References Cited

U.S. PATENT DOCUMENTS

| | | | |
|---|---|---|---|
| 3,601,809 | 8/1971 | Gray | 395/425 |
| 4,607,331 | 8/1986 | Goodrich, Jr. et al. | 395/425 |
| 4,636,946 | 1/1987 | Hartung et al. | 395/425 |
| 4,802,086 | 1/1989 | Gay et al. | 395/425 |
| 4,811,203 | 3/1989 | Hamstra | 395/425 |
| 4,882,642 | 11/1989 | Tayler et al. | 360/78.11 |
| 5,134,563 | 7/1992 | Tayler et al. | 395/250 |
| 5,239,650 | 8/1993 | Hartung et al. | 395/650 |
| 5,241,639 | 8/1993 | Feldbrugge | 395/425 |

FOREIGN PATENT DOCUMENTS

| | | |
|---|---|---|
| 0273665 | 6/1988 | European Pat. Off. . |
| 2214669 | 6/1989 | United Kingdom . |

OTHER PUBLICATIONS

IBM Technical Disclosure Bulletin vol. 15 #1 Jun. 1972, pp. 271–274.
IBM Technical Disclosure Bulletin vol. 17, No. 10, Mar. 1975, pp. 3104–3106.

*Primary Examiner*—David L. Robertson
*Assistant Examiner*—Matthew M. Kim
*Attorney, Agent, or Firm*—H. F. Somermeyer

[57] ABSTRACT

A computer system includes a cache and a data storing system. The data storing system uses a write-once read-many (WORM) disk for storing computer data. The disk stores data in addressable so-called continuation chains. The cache stores pages of data in sets; each set being derived from but one of the continuation chains as having addressing affinity. Page replacement of the cache is in two steps. A first step selects the set having a page of data to be cast out. A least recently used (LRU) selection identifies the set. A second step in the page replacement is performed in one of two procedures. A first procedure, such as for sequentially processed data, selects the LIFO or page of data that was last stored in the cache of any pages in the LRU set. In a second procedure, such as for non-sequentially processed data, any one of a plurality of page selection procedures may be used, such as an LRU procedure for identifying the page of the selected set to be cast out of the cache.

10 Claims, 2 Drawing Sheets

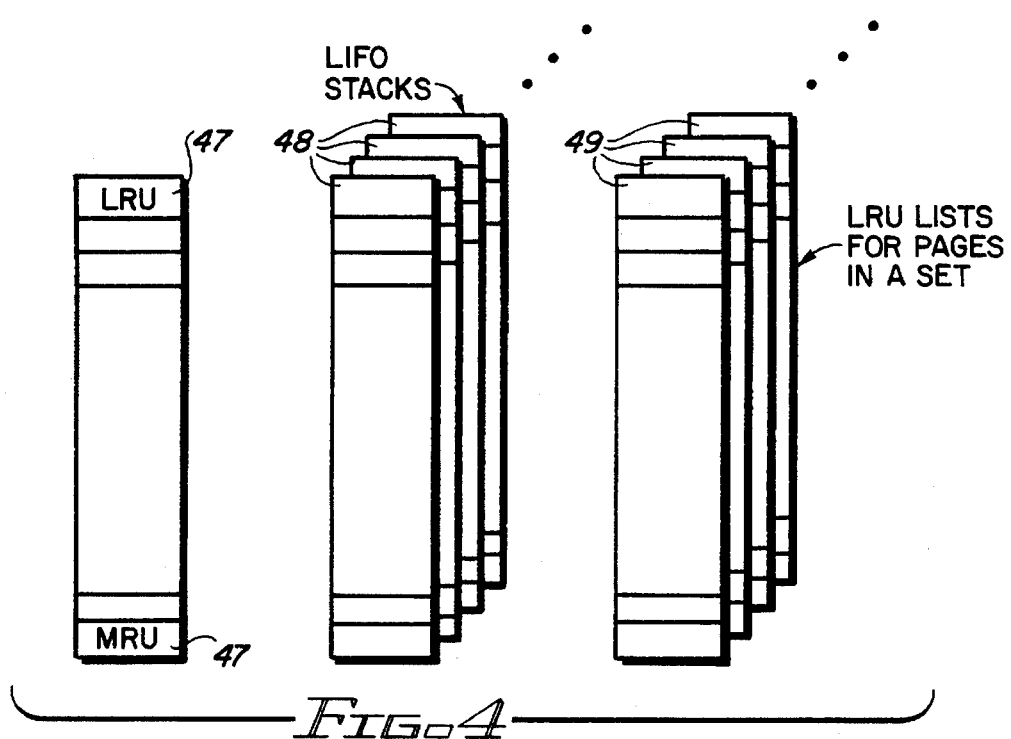
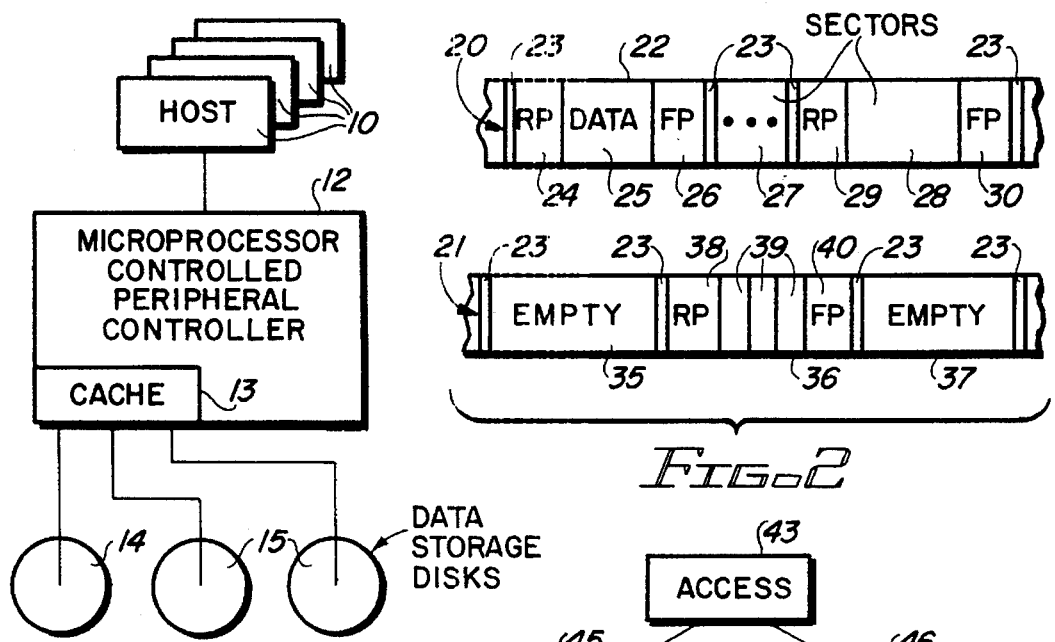
FIG-1
FIG-2
FIG-3
FIG-4

CACHE PAGE REPLACEMENT USING SEQUENTIAL LIFO AND NON-SEQUENTIAL LRU CAST OUT

This is a continuation of the U.S. patent application Ser. No. 07/689,387, filed on Apr. 22, 1991, now abandoned.

FIELD OF THE INVENTION

The present invention relates to data storage systems, particularly to those data storage systems employing write-once optical media in which continuation chains are used in mapping data to the media.

BACKGROUND OF THE INVENTION

Write-Once Read-Many (WORM) media store data in addressable continuation lists or chains. Such lists or chains are linked lists of groups of addressable data-storing areas or disk sectors on WORM media. Generally, a given continuation chain is traversed to its end even when only a portion of the data stored in the chain are desired. A reason for this traversal is that the most recently recorded data, hence the correct data, are stored at a currently unknown location in the chain.

It is desired to cache WORM media operations for enhancing performance of the data storage system. It has been discovered that the usual cache page replacement algorithms when applied to cached WORM optical data storage systems result in poor and degraded performance, rather than the expected reduction in effective access time to data. An apparent reason for such poor performance by the usual page replacement systems is that the operation of the data storage system when operating with media using continuation chains is that medium accessing violates the principles of locality of references on which most page replacement algorithms are based. Locality of references merely means that if there is one read access to a given address, then the probability is that ensuing read accesses will be to addresses similar to or near the given address. Further, the continuation chains result in data being in long contiguous areas on each storage medium. All of these factors appear to cause the known FIFO (first in first out) and LRU (least recently used) to degrade system performance. It is desired to provide an enhanced page replacement method and apparatus which departs from the LRU or FIFO schemes. Typically, when using the above-mentioned page replacement systems, a page being cast out turns out to be a next page requested by a using host processor. Such probability greatly reduces the efficiency of a cache connected to a medium using chaining as a data recording format. Accordingly, it is desired to provide a page replacement algorithm and apparatus which accommodates the format of continuation chains or linked list formatting of data on a storage medium.

Addressing the data can be achieved by two different procedures. A first procedure is by using a hash table of known design. A second procedure is to use a usual directory tree look up. It has been determined that optimum page replacement may be different for the two addressing or data area accessing procedures. It is desired to optimize page replacement based on the data accessing technique.

DISCUSSION OF PRIOR ART

U.S. Pat. No. 4,882,642 shows a page replacement algorithm for a peripheral cache which is not always filled with data. The page replacement algorithm employs the principle of locality of reference typical of leash recently used (LRU) page replacement schemes. As such, the patent is not suggestive of avoiding an LRU system as a primary control for page replacement.

The IBM Technical Disclosure Bulletin in Volume 15, Number 1, June 1972, in pages 271–274 teaches partitioning a cache for enhancing effectiveness of a page replacement algorithm. The taught algorithm requires a locality of references to be effective. The grouping of data in the cache requires the groups to be cyclically used in the page replacement such that the last group used will always be the most recently used (MRU).

U.S. Pat. No. 4,802,086 shows an arrangement similar to the latter reference. This patent uses chains or linked lists relating to cache internal mapping. Such linked list utilization is not related to the usage of linked lists in a backing store and managing a cache to accommodate such data format in the backing store.

Great Britain published application for patent 2,214,669 (published Jun. 9, 1989) teaches dividing a cache for a main memory into sets. The page replacement selects a page to be cast out from a set which does not contain the most recently used (MRU) page. Data in each set is not related by accessing as data stored in a backing store in linked-list sets are related to the claims of this application.

SUMMARY OF THE INVENTION

It is an object of this invention to provide an efficient page replacement method and apparatus for use with data stored in a backing store in the form of continuation lists or chains.

It is another object of this invention to select a page replacement procedure based upon a method of accessing data.

In accordance with a first aspect of the present invention, page replacement of a cache connected to a backing store is based on setting prioritized sets or groups of data units, each set or group being derived from a continuation chain storing data in a backing store. A plurality of sets or groups can be derived from a common continuation chain of the backing store. A set is selected to contain the page to be replaced based on any one of several schemes, such as LRU, FIFO, etc. The page in the selected group is identified by a last in first out (LIFO) page selection within any of the sets.

In another aspect of the present invention the page replacement set forth above is used when a hash table is used in data addressing. When a directory tree is used for data addressing, then the least recently used (LRU) page in a selected set is identified as the page to be cast out and replaced.

The foregoing and other objects, features, and advantages of the invention will be apparent from the following more particular description of preferred embodiments of the invention, as illustrated in the accompanying drawings.

DESCRIPTION OF THE DRAWINGS

FIG. 1 is a simplified block diagram of a data storage system in which the present invention is advantageously practiced.

FIG. 2 illustrates in simplified form continuation chains or lists used as a format for storing data in a backing store of the FIG. 1 illustrated system.

FIG. 3 illustrates data addressing paths used in the FIG. 1 illustrated system.

FIG. 4 illustrates tables used to control the page replacement of the cache of the FIG. 1 system.

DETAILED DESCRIPTION

Figure 5:
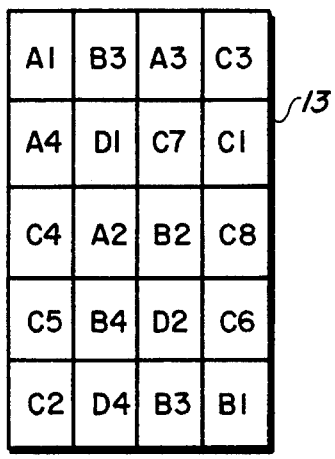
FIG. 5 diagrammatically shows cache allocations used to explain the present invention.

Referring now more particularly to the appended drawing, like numerals indicate like parts and structural features in the various figures. One or .lore host processors 10 are connected to a microprocessor controlled peripheral controller 12. Controller 12 has a cache 13 (high speed random access memory, for example). Cache 13 caches data being transferred between a host processor 10 and a data storing system having one or more disk data storage units or devices 14, 15. In the illustrated embodiment, devices 14, 15 employ write-once read-many (WORM) media. The FIG. 1 illustrated arrangement may take several forms. In a so-called personal computer, such its IBM PS/2 computers, the peripheral controller may constitute a circuit board plugged into a card slot of the PS/2 computer. In other machines the host processor 10 and controller 12 may share a printed circuit board or be embodied in a single semiconductor chip. At the so-called high end, separate entities may be used for the host processor and the controller.

FIG. 2 illustrates the so-called continuation chains commonly used to addressably store data on WORM media. Two tracks 20 and 21 of a WORM medium are shown. Each track is segmented into sectors by sector marks 23; the track area between adjacent sector marks 23 constitute an addressable sector of a track. In this regard, optical media often comprise a single spiral track; as used herein, one circumvolution of a spiral track is referred to as a track. Each sector has a similar data storing format. Sector 22 has a reverse pointer field RP 24 which addressably points to an immediately preceding sector of a continuation chain. Such immediately preceding sector may be a next contiguous sector or in a different track. Data field 25 stores one page of data as that term is used in the illustrated embodiment. It is to be understood that one page of data may require a cluster of sectors 22 for storage. The last field in sector 22 if forward pointer field FP 26 which addressably points to a next succeeding sector of the continuation chain, such as the sectors in track 20 represented by ellipsis 27. A last of the contiguous sectors is sector 28 which has RP field pointing to an adjacent sector of ellipsis 27 and a forward pointer 30 addressably pointing to sector 36 of track 21 for example. Empty sector 35 may have been allocated for another continuation chain (not shown) and be awaiting data to be stored. Sector 36 includes RP field 38 having a pointer addressably pointing to sector 28, FP field 490 storing a pointer addressably pointing to allocated but empty sector 37. Sector 37 is awaiting for the described continuation chain to receive and store more data; in the meantime, empty sector 37 (also termed a null sector) indicates the end of the described continuation chain. Sector 36 is shown as having three separate data elements 39 stored as one page of data. It is to be appreciated that; continuation chains in optical media are dispersed over and interleaved with other chains and other data on such media.

FIG. 3 illustrates addressably accessing continuation chains of an optical medium. Accessing data stored in cache 13 uses the backing store or disk storage 14, 15 addressing for accessing, as is common practice. A cache 13 access 43 uses backing store or optical medium addresses to find pages of data in cache 13 or to store pages of data in cache 13. A usual directory, not separately shown, translates the backing store addresses to cache addresses. The cache 13 addressing can follow one of two paths, a first path using hash table 45, of usual construction, for addressably accessing primarily sequentially processed data in cache 13; such data being represented as a part of data 44 in FIG. 3. For non-sequentially processed data, access 43 employs a directory or hierarchial address tree 46 for accessing data 44. The status of data 44 in cache 13 may change with time as a function of host processor 10 operation or may be pre-ordained as such by host processor 10 sending signals to controller 12 for selecting sequential mode or non-sequential mode of operation for certain data.

FIG. 4 diagrammatically illustrates control structures for implementing a page replacement control in the illustrated storage system. Data are stored in cache 13 as shown in later described FIG. 5. For the current description, suffice it to say that data in cache 13 are stored in sets of pages; each set being derived from one of the continuation chains discussed with FIG. 2. For purposes of discussion, selection of which set of data pages will contain a page of data to be cast out is based upon an LRU list 47, no limitation thereto intended. Each set in cache 13 is represented in LRU list 47. One end 47MRU represents the set which is most recently used while the other end 47LRU represents the set least recently used. The set identified as 47LRU is the set from which a page will be cast out of cache 13. Upon each access, list 47 is updated by causing an entry for a set of pages to be in the 47MRU position, as is known in the art for maintaining LRU lists.

When hash table 45 is employed in accessing, the data in the set accessed are denoted as being sequentially processed. The designation of sequentially processing data can be determined by any procedure, no limitation to a given addressing scheme is intended. For sequentially processed data in a set, the page of such set to be cast out is the last stored page of data. Such identification is achieved by push-down pop-up or LIFO stacks 48, one stack for each of the sets having sequentially processed data. In one embodiment, page identification in a set of pages used the push-down stacks 48. A top entry in each of the stacks identifies the last page stored into cache 13 of that particular set of pages. Once a stack 48 for a selected set of pages is "popped", the page at the top of the stack is selected as the last-stored page of that set and is cast out. The advantage of casting out a last-stored page, such a casting out may appear to be contrary to all prior teachings, is that such last-stored page will likely be the last page accessed in the set. This indication of last probably accessing results in a minimal delay in total system processing of pages of data through cache 13. Note that the page cast out is not necessarily the page last-stored in cache 13; rather is the last-stored page of a least recently accessed set of pages.

Numeral 49 collectively designates a plurality of LRU lists for pages in a non-sequentially processed set of pages. Procedures other than an LRU may be used for selecting a predetermined page from sets having non-sequentially processed data may be selected.

FIG. 5 diagrammatically shows a data storage mapping of cache 13 at one given instant of time. Cache 13 has the capability of storing 20 pages of data. Four sets of data A, B, C and D are shown as respectively having pages A1–A4, B1–B4, C1–C8 and D1–D4. Each of these sets of pages are derived from a continuation chain as described for FIG. 2. As an example, sets A and B are derived from the same chain, set A has a set of pages stored contiguously on the optical medium having positions in a first continuation chain of 131 through 134 while set B has pages from the same continuation chain having pages stored in positions 11 through 14. The term contiguous means successive positions in a continuation chain; adjacent successive chain positions may be physically separated on the optical medium. Sets C and D of pages are from two different continuation chains. All pages in each set being from contiguous chain positions are said to have an addressing affinity. The location of the pages in cache 13 have no relationship to being members of a set.

Figure 6:
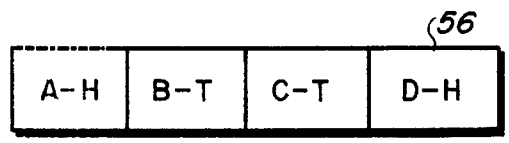
FIG. 6 diagrammatically shows a register used to select the page replacement procedure based on addressing data in the backing store.

FIG. 6 illustrates a register 56 having one position for each of the four sets, A–D. The letters H and T respectively indicate addressing paths hash table 45 and hierarchial tree 46. The sets A–D positions of register 56 may be set in any one of a plurality of procedures. Host processor 10 may designate the type of accessing procedure as being sequential or non-sequential, the operation of the cache may be monitored to detect the type of accessing, the operation of the devices 14, 15 may be similarly monitored, etc.

Figure 7:
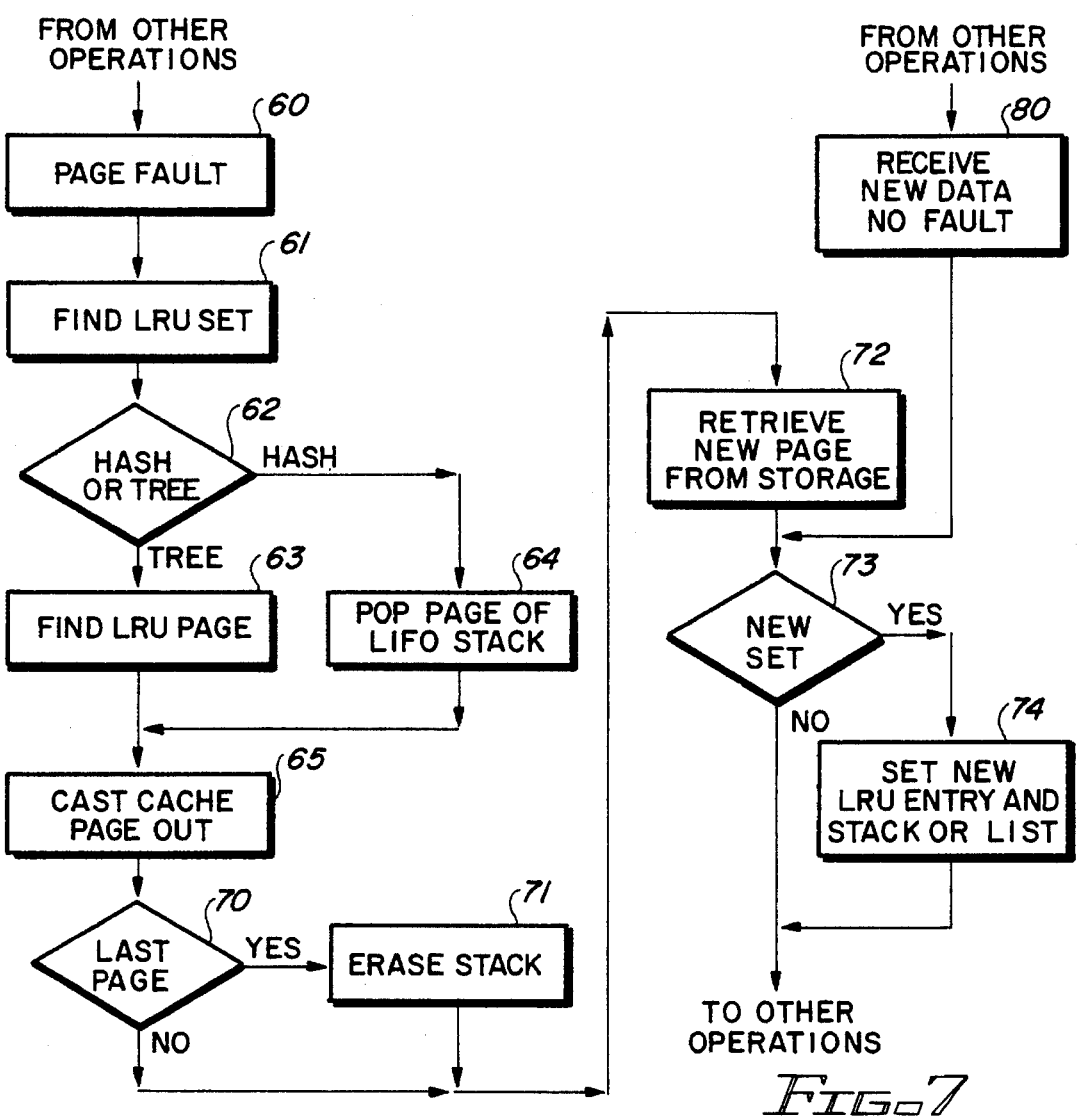
FIG. 7 is a simplified machine operations chart showing an embodiment of the present invention as practiced in the FIG. 1 illustrated system.

FIG. 7 shows machine operations in the FIG. 1 illustrated system for effecting the illustrated page replacement. It is preferred that the page replacement be program implemented in either controller 12, host processor 10 or split between the two units. It is assumed that the computer means consisting of host processor 10 and controller 12 is performing data processing operations. It is also assume that cache 13 is filled with data and that no page of data has been cast out before a need to store new data has arisen. At machine step 60 a page fault is detected and indicated by an attempt by controller 12 to store a page of data in cache 13. At machine step 61 (find LRU set), the LRU list 47 is examined to identify the least recently access set of pages. Once the LRU set is identified at the position 47LRU of list 47, controller 12 examines register 56 for determined the addressing mode of the LRU set. Sets B and C were accessed via tree 46 whilst sets A and D were accessed via hash table 46. Assuming that hash table 46 was last used to access the LRU set, at machine step 64 controller 12 finds the LIFO stack 48 for the LRU set, pops the stack to identify the last stored page of data in the LRU set. At machine step 65, controller 12 casts out (erases the page or erases the addressability of a page) the identified page of data from cache 13. Similarly, when tree 46 was last used in a cache-access, the LRU list 49 for the LRU set is found and the LRU page in that set is identified as the page of data to be cast out from cache 13 at step 65.

From machine step 65, controller 12 in machine step 70 determines whether or not the cast out page of data was the last page in the LRU set; if yes, the stack 48 for such set is erased at machine step 71. Otherwise, machine step 72 is performed to retrieve data from either host processor 10 or a device 14, 15 for storage in cache 13. At machine step 73 whether or not a new set of pages is to be generated is tested. If a new set is not required, i.e. the data to be stored in cache 13 has addressing affinity for data in an existing set, then the computer means proceeds to other operations via path 75. Such other operations include storing the data in cache 13. Such storing includes updating LRU list 47 for the set entry, stack 48 for the set and/or LRU list 49 for the set. The latter procedures follow known updating techniques. Otherwise, from machine step 73, at machine step 74, a new set entry into LRU list 47 is added as 47MRU and a new stack 48 and LRU list 49 are created to accommodate changes in modes of accessing. In one embodiment, only stacks 48 were used. From machine step 74, other operations are performed.

New data to be stored in cache may arise from other operations when there are vacant pages in cache. At machine step 80, such new data is received and no page fault results. Machine step 73 is then performed followed by other operations which included actually storing the data in cache 13.

While the invention has been particularly shown and described with reference to preferred embodiments thereof, it will be understood by those skilled in the art that various changes in form and details may be made therein without departing from the spirit and scope of the invention. For example, it should be noted that peripheral controller 12 may be a pluggable circuit board in a host computer, be embedded as a part of a host computer, an attachment card to a host computer, or be a separate standing unit connected to a host computer. Also, such peripheral controller may be programmed in large part in a host processor.

What is claimed is:

1. In a machine-effected method of managing data storage space in a cache arranged to store data in addressable pages for casting out pages of stored data to be replaced by new data, a backing store connected to the cache for storing said pages of data in a plurality of addressable continuation chains, each of said addressable continuation chains having a plurality of said pages of data stored in respective addressable data storage areas of said backing store;

machine-executed steps of:

in said cache, storing said pages of data in a plurality of sets, each of said sets storing pages of data from respective ones of said continuation chains in said backing store;

in said cache, for each said set, first indicating, in a sequence indication, a sequence of storing in said cache said pages of each of said sets for indicating in each of said sets a last stored one of the pages in the respective sets;

in the cache, second indicating that a page of data is to be cast out of said cache;

responding to said second indicating step for first identifying a first one of said sets stored in said cache from which a page is to be selected for cast out form said cache;

then, first examining said sequence indication of said first one of said sets for identifying said last stored page in said first one of said sets as a cast out page;

then, casting out said cast out page from said first one of said sets;

establishing first and second addressing procedures for accessing said sets;

selecting said first procedure for primarily sequential page accessing and selecting said second procedure for randomly accessing said sets;

maintaining an indication of the access procedure last used in accessing the page sin all of said sets in said cache;

in third identifying step, determining from said maintained indication which of said cache accessing procedures was used to access a page of data in said cache;

if said second cache accessing procedure was last used to access a page of data in said cache, then second identifying a second one of said sets that is storing pages of data that contains pages of data to be candidates to be cast out of said cache;

determining which of said pages of data is a least recent used page of said second one of said sets, then selecting said least recent used page in said second set to be said cast out page;

if said first addressing procedure was least used, then performing said first examining step;

in said first accessing procedure using a hash table to address pages in the cache;

in said second accessing procedure using a directory tree to address pages in the cache;

attempting to store a new data page into the cache, detecting that the cache is full of data;

then in response to detecting said cache is full of data, indicating a page fault;

in response to indicating a page fault, performing said first identifying step that identifies a page of data to be cast out, then performing said first examining step and said casting out step;

then storing said new page of data in said cache;

in said attempting to store step, generating an address of a predetermined one of said addressable continuation chains in said backing store storing said new page for addressing said predetermined one of said addressable continuation chains;

examining predetermined ones of said sets in the cache for identifying a predetermined one of said examined sets to receive and store said new page of data;

then identifying said predetermined one of said examine sets to be said first one of said sets for casting out a last stored page from said first one of said sets and then storing the new page in said first one of said sets;

otherwise, identifying said least recent accessed set to be said second set, then establishing a new set in said cache for receiving and storing said new page of data.

2. In the machine-effected method set forth in claim 1 further including, said backing store including a write-once read-many optical record medium storing data in said plurality of addressable continuation chains including machine-executed steps of:

establishing each of said sets in the cache such that all pages of data in each respective said set are contiguously stored in the backing store respectively in said addressable continuation chains; and establishing a separate set in the cache for storing contiguous pages of data in respective ones of said continuation chains that are not contiguous with other pages of data in said respective addressable continuation chains.

3. In apparatus for effecting page replacement in a cache having a plurality of addressable sets, said sets respectively storing a plurality of pages of data, the apparatus including, in combination:

backing store means connected to the cache for storing said pages of data in addressable continuation chains;

cache control means connected to the cache for inserting each page of data from respective ones of said continuation chains into said sets;

page control means having first means for identifying a first one of said sets having a page for casting out of said cache;

last one means in said page control means for detecting and indicating a last stored one of said pages in each of said sets;

cast out control means connected to the page control means and to said last one means, said cast out control means responding to said last one means for selecting said last stored one of said pages in a first one of said sets as a cast out page of data to be cast out of said cache;

cast out means connected to the cast out control means for casting out said cast out page;

set means for indicating data accesses to said sets;

least recently used LRU means connected to the set means and to the page control means for creating and maintaining an LRU list of said sets for identifying a least recently used set as an LRU set;

said page control means being connected to the LRU means for selecting said LRU set as said first one of said sets;

page fault means detecting that data are to be stored in the cache and insufficient empty pages of cache are available for receiving and storing such data to be stored for indicating a page fault;

said page control means being connected to the page fault means for responding to said page fault indication to select said LRU set to be aid first one of said sets;

data storing means connected to said page control means, to said backing store means and to said cache control means for reading pages from said backing store, then storing said read pages in said cache in respective ones of said sets;

said data storing means for addressably accessing the addressable continuation chains for retrieving and storing data from and to the backing store;

said cache control means being connected to the data storing means for responding to the data storing means reading pages of data from a given one of the addressable continuation chains to assign and store said retrieved pages of data to a predetermined one of said sets;

coincidence means for detecting and indicating that a predetermined one of said sets stores pages from said given one of said continuation chains, said cache control means responding to said coincidence means for storing said read page in said predetermined one of said sets; and said cache control means responding to said coincidence means indicating that said cache is not storing any page from said given one of said addressable continuation chains to create a new set for storing said read page.

4. In the apparatus set forth in claim 3 further including, in combination:

second means in the page control means for identifying a second one of said sets storing pages of data that can be cast out; and said cast out control means identifying one of said first or second sets as containing said page of data to be cast out;

said cast out control means having second set page means for identifying a least recently used one of the pages of data in said second one of said sets as said page of data to be cast out form the cache.

5. In the apparatus set forth in claim 4 further including, in combination:

cache addressing means for accessing addressed one of the pages by first or second page addressing means, said first page addressing means being primarily sequential addressing of pages in the cache and said second page addressing means being primarily one-sequential address of pages in the cache;

access status means connected to the cache addressing means for storing and indicating which of said first or second page addressing means was last used to address pages of data in said cache; and said cast out control means being connected to the access status means for responding to the indications of said first or second addressing means to respectively select one of said last stored page in the identified first set or said predetermined page of data from said second set to be cast out from said cache.

6. In the apparatus set forth in claim 5 further including, in combination:

said first page addressing means including a hash table for addressably accessing pages in the cache; and said second page addressing means including hierarchical table means for addressably accessing pages in the cache.

7. In a machine-effected method of managing data storage space in a cache arranged to store data in addressable pages for casting out pages of stored data to be replaced by new data, a backing store connected to the cache for storing said pages of data in a plurality of addressable continuation chains, each of said continuation chains storing a plurality of said pages of data in respective addressable data storage areas of said backing store;

machine-executed steps of:

in said cache, storing said pages of data in a plurality of sets, each of said sets storing pages of data from respective ones of said continuation chains in said backing store;

in said cache, for each said set, first indicating in a sequence indication a sequence of storing in said cache said pages of each of said sets for indicating in each of said sets a last stored one of the pages of the respective sets;

in the cache, second indicating that a page of data is to be cast out of said cache;

creating and maintaining a least recent access list of said sets for identifying a given one of said sets as a least recent accessed one of said sets;

responding to said second indicating step for first identifying said given one of said sets form which a page is to be cast out;

then, first examining said sequence indication for identifying said last one of said pages in said given one of said sets, said identified last one of said pages in said given one of said sets being a cast out page;

then, casting out said cast out page from said first one of said sets;

attempting to store a new page of data in a second one of said sets in the cache;

detecting that said cache is full of data, then in response to detecting that said cache is full of data indicating a page fault for said cache;

in response to the indicated page fault, performing said second indicating step, said first examining step and said casting out step;

then storing said new page of data in said second one of said sets in said cache;

in said attempting to store step, generating an address of a predetermined one of said addressable continuation chains in said backing store storing said new page in said backing store for addressing said predetermined one of said addressable continuation chains, addressing said predetermined one of said addressable continuation chains;

second examining predetermined ones of said sets in the cache for identifying a predetermined one of said examined sets to be said second one of said sets;

in said second examining step, first checking whether or not said new page of data is stored in said addressed predetermined one of said addressable continuation chains, if said new page is addressable in said cache in a predetermined one of said sets, then selecting said predetermined one of said sets to be said second one of said sets;

otherwise, establishing a new set in said cache; and then storing said new page in said established new set as said second set.

8. In the machine-effected method set forth in claim 7 further including, said backing store including a write-once read-many optical record medium storing data in said plurality of continuation chains; machine-executed steps of:

establishing each of said sets of pages in the cache such that all pages in each of said sets are contiguously stored in a respective one of said continuation chains; and respectively establishing separate ones of said sets in said cache for pages of data that are not contiguous in said one of the continuation chain.

9. In the machine-effected method set forth in claim 7, further including machine-executed steps of:

establishing first and second addressing procedures for accessing said sets of pages stored in said cache;

selecting said first procedure for primarily sequential page accessing and selecting said second procedures for randomly accessing said pages of data;

maintaining an indication of a most recently used one of said addressing procedures used in accessing the pages in any one of said sets in said cache;

in third identifying step, determining from said maintained indication which of said cache accessing procedures was used to access a page of data in said cache; and if said first addressing procedure was last used, then selecting said last stored page to be said cast out page and if said second addressing procedure was last used, selecting a least recent used page to be said cast out page.

10. In the machine-effected method set forth in claim 9 further including the machine-executed steps of:

in said first accessing procedure using a hash table to address pages in the cache; and in said second accessing procedure using a directory tree to address pages in the cache.

* * * * *

UNITED STATES PATENT AND TRADEMARK OFFICE
CERTIFICATE OF CORRECTION

PATENT NO. : 5,481,691
DATED : January 2, 1996
INVENTOR(S) : K. F. Day, et al.

It is certified that error appears in the above-indentified patent and that said Letters Patent is hereby corrected as shown below:

```
Column 6, Line 49    Change "form" to --from--
          Line 63    Change "page sin" to --pages in--
Column 8, Line 65    Change "form" to --from--
Column 9, Line 50    Change "form" to --from--.
```

Signed and Sealed this

Eleventh Day of June, 1996

Attest:

BRUCE LEHMAN

*Attesting Officer*  *Commissioner of Patents and Trademarks*